US009384225B2

(12) United States Patent
Shebanow

(10) Patent No.: US 9,384,225 B2
(45) Date of Patent: Jul. 5, 2016

(54) SYSTEMS AND METHODS FOR PROVIDING HI-FIDELITY CONTEXTUAL SEARCH RESULTS

(71) Applicant: Andrew Shebanow, San Jose, CA (US)

(72) Inventor: Andrew Shebanow, San Jose, CA (US)

(73) Assignee: Adobe System Incorporated, San Jose, CA (US)

(*) Notice: Subject to any disclaimer, the term of this patent is extended or adjusted under 35 U.S.C. 154(b) by 0 days.

(21) Appl. No.: 13/717,852

(22) Filed: Dec. 18, 2012

(65) Prior Publication Data

US 2014/0304273 A1    Oct. 9, 2014

Related U.S. Application Data

(62) Division of application No. 12/166,952, filed on Jul. 2, 2008, now Pat. No. 8,359,302.

(51) Int. Cl.
*G06F 17/30* (2006.01)

(52) U.S. Cl.
CPC .......... *G06F 17/30321* (2013.01); *G06F 17/30* (2013.01)

(58) Field of Classification Search
CPC ............... G06F 17/30321; G06F 17/30424; G06F 17/30312; G06F 17/30336; G06F 17/30613; G06F 17/30011; G06F 17/30619; G06F 17/3002
USPC ................................................ 707/705, 741
See application file for complete search history.

(56) References Cited

U.S. PATENT DOCUMENTS

| | | | |
|---|---|---|---|
| 6,397,213 B1* | 5/2002 | Cullen et al. | |
| 6,496,818 B1* | 12/2002 | Ponte | |
| 6,735,586 B2 | 5/2004 | Timmons | |
| 7,240,067 B2 | 7/2007 | Timmons | |
| 7,577,902 B2 | 8/2009 | Hong et al. | |
| 7,885,955 B2* | 2/2011 | Hull | G06K 9/00442 707/722 |
| 7,917,554 B2* | 3/2011 | Hull et al. | 707/915 |
| 8,041,701 B2 | 10/2011 | Amato et al. | |
| 8,060,518 B2 | 11/2011 | Timmons | |
| 8,108,371 B2 | 1/2012 | Dharmarajan et al. | |
| 2001/0044810 A1 | 11/2001 | Timmons | |
| 2004/0199497 A1 | 10/2004 | Timmons | |
| 2006/0265417 A1 | 11/2006 | Amato et al. | |
| 2007/0027902 A1* | 2/2007 | Ponte | G06F 17/30864 |
| 2007/0130318 A1 | 6/2007 | Roast | |
| 2008/0027928 A1 | 1/2008 | Larson | |
| 2009/0024574 A1 | 1/2009 | Timmons | |
| 2009/0171755 A1 | 7/2009 | Kane et al. | |
| 2009/0313100 A1 | 12/2009 | Ingleshwar | |

OTHER PUBLICATIONS

Khoubyari, S. et al., "Keyword Location and Noisy Document Images," Second Annual Symposium on document Analysis and Information Retrieval, Las Vegas, NV, Apr. 26-28, 1993, pp. 217-231.*
Dumais et al., "Optimizing Search by Showing Results in Context," SIGCHI'01, Mar. 31-Apr. 4, 2001, Seattle WA.
Brin et al., "The Anatomy of a Large-Scale Hypertextual Web Search Engine," Computer Science Dept., Stanford Univ., Stanford, CA.

* cited by examiner

*Primary Examiner* — Sheree Brown
(74) *Attorney, Agent, or Firm* — Kilpatrick Townsend & Stockton LLP

(57) ABSTRACT

Systems and methods for providing hi-fidelity contextual search results are described. In one described embodiment, a method for providing hi-fidelity contextual search results includes receiving a query comprising a search term, determining a location on a page that is responsive to the query, wherein the page has a native appearance, determining a contextual area associated with the location on the page, and causing the contextual area to be output in a hi-fidelity result set, wherein the contextual area has an appearance the same as the native appearance of the page.

20 Claims, 6 Drawing Sheets

SYSTEMS AND METHODS FOR PROVIDING HI-FIDELITY CONTEXTUAL SEARCH RESULTS

The present application is a divisional application of U.S. Ser. No. 12/166,952 filed on Jul. 2, 2008, now allowed, entitled "SYSTEMS AND METHODS FOR PROVIDING HI-FIDELITY CONTEXTUAL SEARCH RESULTS," the disclosure of which is hereby incorporated herein by reference.

FIELD OF THE DISCLOSURE

Embodiments of the disclosure relate generally to indexing and retrieval of pages. More particularly, embodiments of the disclosure relate to systems and methods for providing hi-fidelity contextual search results.

BACKGROUND

Computer software applications for searching and providing results of searches are known in the art. Such applications include Internet search engines, such as those provided by Google® and Yahoo® document management systems, such as ones provided by Interwoven®; and Internet-based document management systems, such as the Share service provided by Adobe®.

Conventional software applications for searching document collections and providing results of the searches are typically text-based. For example, some conventional applications allow a user to input search criteria using an input device, such as a keyboard, and return the search results as a web page containing text. Some such applications return contextual search results. For instance, conventional applications may return a set of search results with the search terms highlighted or otherwise emphasized within the search result list.

In order to respond to search requests, conventional search applications rely on some form of indexing. For example, conventional systems may employ a software application known as a "crawler" to traverse a set of web pages and other content. This content may be local or may be distributed across a network, such as the Internet. Once the crawler has traversed the content, it stores information about the content, including its location, in an index.

SUMMARY

Embodiments of the disclosure provide systems and methods for providing hi-fidelity contextual search results. One embodiment is a method comprising receiving a query comprising a search term; determining a location on a page that is responsive to the query, wherein the page has a native appearance; determining a contextual area associated with the location on the page; and causing the contextual area to be output in a hi-fidelity result set, wherein the contextual area has an appearance the same as the native appearance of the page.

Another embodiment is a method comprising receiving a page having a native appearance; identifying a keyword on the page; generating an index entry having the keyword, a page identifier, and a coordinate location associated with the keyword on the page; storing the index entry; and rendering an image of at least the coordinate location on the page associated with the keyword, wherein the image has the native appearance of the page. In other embodiments, a computer-readable medium (such as, for example, random access memory or a computer disk) comprises code for carrying out these methods.

These embodiments are mentioned not to limit or define the disclosure, but to provide examples to aid understanding thereof. Embodiments are discussed in the Detailed Description, and further description is provided there. Advantages offered by the various embodiments may be further understood by examining this specification.

BRIEF DESCRIPTION OF THE DRAWINGS

These and other features, aspects, and advantages of the present disclosure are better understood when the following Detailed Description is read with reference to the accompanying drawings, wherein.

DETAILED DESCRIPTION

Figure 1:
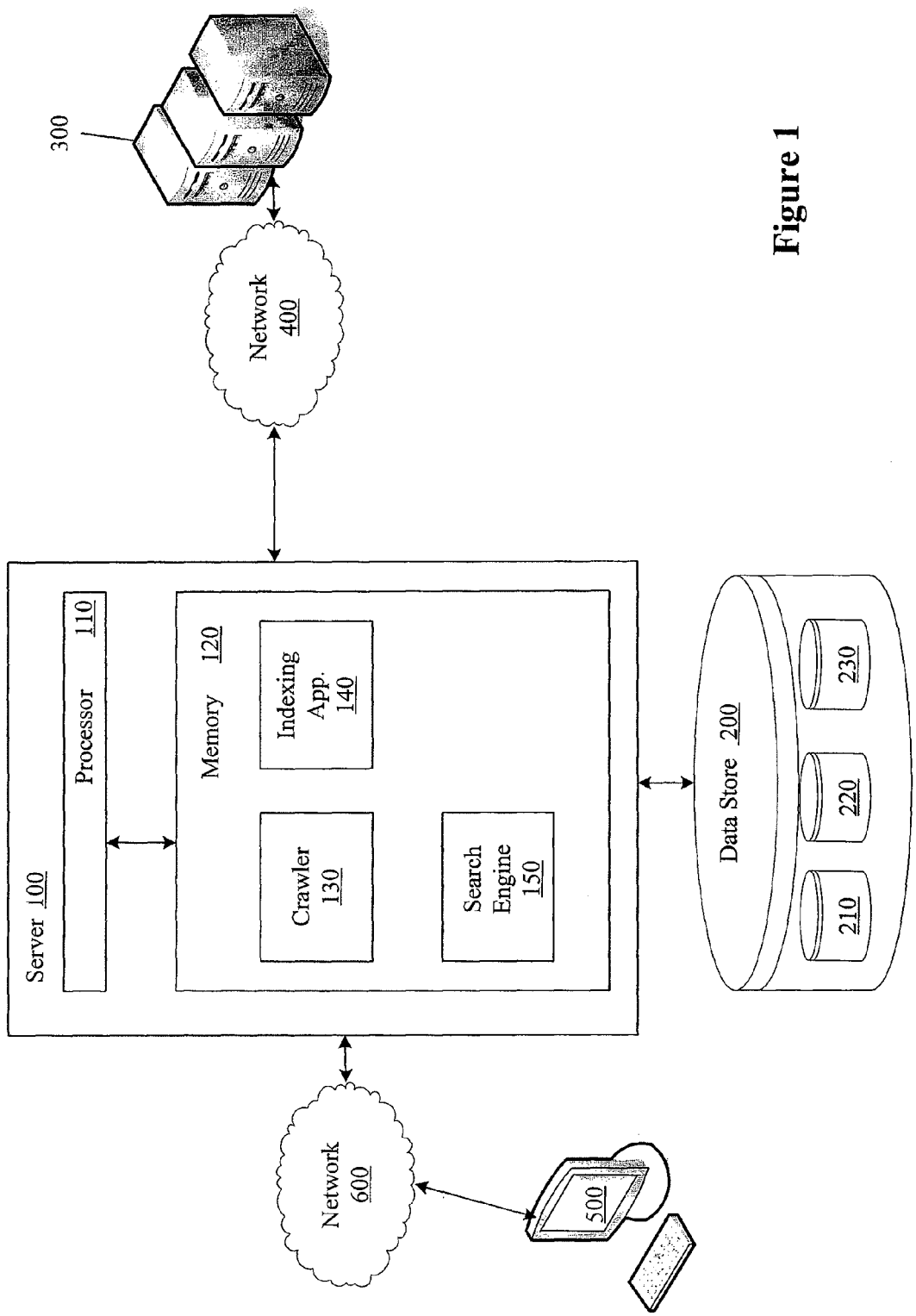
FIG. 1 is a diagram illustrating an exemplary environment for implementation of one embodiment.

Embodiments of the disclosure provide systems and methods for providing hi-fidelity contextual search results.

Illustrative Embodiment of Hi-Fidelity Contextual Search

In one illustrative embodiment, a server dispatches a crawler to generate an index of documents. As the documents are indexed, the server determines the file type of the document (e.g., Microsoft Word® format or Adobe Portable Document Format® ("PDF®")). In one embodiment, if the server determines that the file type is not PDF®, then the server converts the document to PDF® format.

As part of indexing the document, the server determines the location on the document of one or more words. The server stores this location along with various other information about the document, including, for example, a unique identifier for the document and the word itself. The server may also store structural information regarding each document, including, for example, the layout of the document (e.g., a web page that includes columns).

In one illustrative embodiment, the server also performs a rendering process. During the rendering process, the server creates an image from each page in a document. Many document formats, such as PDF® and Microsoft Word®, divide documents into pages. However, the term "page," as used herein, should not be so limited. For example, an entire document of any format, or any portion thereof, can comprise a "page." Further, a portion of a page can comprise a "page." Therefore, the term "page" should not be construed as limiting the scope of the disclosure. The locations stored by the indexing process described above correspond to locations on the document of each word in the each image that is created during the rendering process.

Once the documents have been indexed and rendered, a user can search for keywords that may appear in the documents. In one illustrative embodiment, the user enters a query and submits it to a server. In response to receiving the query, the server searches the index for keyword(s) that satisfy the query and identifies one or more pages within the documents that contain content that is responsive to the query. The server next identifies the location on the page image that contains the responsive content, i.e., the keyword that is relevant to the user's query. The server also identifies a contextual area around the location based on properties of the page. The server then extracts the contextual area and renders it as an image. The server next provides the image to the user as part of a hi-fidelity result set. The image of the contextual area provided as part of the hi-fidelity result set has the same native appearance as the page. The native appearance may include the same formatting, fonts, and/or graphics present on the page.

This illustrative example is given to introduce the reader to the general subject matter discussed herein. The disclosure is not limited to this example. The following sections describe various additional embodiments and examples of methods and systems for providing hi-fidelity contextual search results.

Illustrative Environments for Providing Hi-Fidelity Search Results

Referring now to the drawings, in which like numerals indicate like elements throughout the several figures, FIG. 1 is a diagram illustrating an exemplary environment for implementation of one embodiment. Other embodiments may be utilized. The embodiment shown in FIG. 1 includes a server 100 that comprises a processor 110 and a memory 120. In the memory 120 are stored applications, including a web crawler 130, an indexing application 140, and a search engine 150. Such applications may be resident in any suitable computer-readable medium and executable on any suitable processor. Such processors may comprise, for example, a microprocessor, an ASIC, a state machine, or other processor, and can be any of a number of computer processors, such as processors from Intel Corporation, Advanced Micro Devices Incorporated, and Motorola Corporation. The computer-readable media stores instructions that, when executed by the processor, cause the processor to perform the steps described herein.

Embodiments of computer-readable media comprise, but are not limited to, an electronic, optical, magnetic, or other storage device, transmission device, or other device that comprises some type of storage and that is capable of providing a processor with computer-readable instructions. Other examples of suitable media comprise, but are not limited to, a floppy disk, CD-ROM, DVD, magnetic disk, memory chip, ROM, RAM, PROM, EPROM, EEPROM, an ASIC, a configured processor, all optical media, all magnetic tape or other magnetic media, or any other medium from which a computer processor can read instructions. Also, various other forms of computer-readable media may be embedded in devices that may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

In a further embodiment, each of the processes performed by the server 100 is performed on a separate server, to wit: there are separate indexing, rendering, and display servers. In still further embodiments, multiple servers are used to perform various tasks, including, for example indexing, rendering, and search engine. In such embodiments, techniques such as clustering or high availability clustering may be used. Benefits to architectures such as these include redundancy and performance, among others.

In the embodiment shown, the server 100 is in communication with a data store 200, which includes an image database 210, an index database 220, and a structural database 230. In an alternative embodiment, a single database contains image, structural, and index data. In further embodiments, structural data, and/or index data, and/or images are stored across multiple databases.

The server 100 is also in communication with other external servers 300 via a network 400. Further, the server 100 is in communication with a user's computer 500 via a network 600. The networks 400, 600 may be any of a number of public or private networks, including, for example, the Internet, a local area network ("LAN"), or a wide area network ("WAN"). In one embodiment, a single computer that is not connected to a network is searched in order to index documents on that computer. Such an embodiment may be utilized as a search appliance. The documents located on the external servers 300 may be in a variety of formats, including, for example, Hypertext Markup Language ("HTML"), XML, PDF®, Microsoft Word® Document format, plain text, and rich text.

One embodiment includes a crawler 130. The crawler 130 methodically and automatically traverses computers 300 in communication with a network 400 searching for documents. When the crawler 130 finds a document, it downloads the document. In some embodiments, the crawler 130 traverses computers 300 on a network 400 searching for documents based on format of the document. For instance, the crawler 130 may search for all documents of a format in an inclusion list or for documents that are of any format except those named in an exclusion list. In one embodiment, when the crawler 130 finds a document, it downloads the document and stores it on the server 100. In another embodiment, the crawler 130 temporarily saves the document into an image database 210.

In the embodiment shown in FIG. 1, once the crawler 130 has located one or more documents, an indexing application 140 processes the documents. In one such embodiment, the indexing application 140 processes one document at a time. First, the indexing application 140 converts a document to PDF® format, and then renders each page of the document into an image. The indexing application 140 next processes each individual word in the document. For each word, the indexing application 140 identifies and stores in an index database 220 a set of coordinates defining a rectangle surrounding the word. In on one such embodiment, the indexing application 140 also identifies and stores structural information about the page in a structural database 230. The indexing application 140 may skip words included in an exclusion list, such as stop words. In a further embodiment, the indexing application 140 processes words included in an inclusion list.

In one embodiment, a search engine 150 retrieves and provides a result list in response to a query. The search engine 150 searches the index database 220 to determine whether it includes information regarding pages that are responsive to the query. Next, if the search of the index database 220 returned one or more pages that are responsive to the query, the search engine 150 retrieves one or more images from the image database 210. Further, the search engine 150 uses information retrieved from the structural database 230 to determine how to provide the search results. The search engine 150 renders an image comprising the search results as a part of a hi-fidelity result set. The hi-fidelity result set comprises the image so that the portion of the results presented to the user is in its native appearance—e.g., with the same formatting, fonts, graphics, and/or other distinguishing features present on the original page. Thus, it is a hi-fidelity search result. In one embodiment, the hi-fidelity result set includes contextual data. For instance, in one such embodiment, the search terms that the user provided are highlighted in the hi-fidelity result set.

In the embodiment shown in FIG. 1, the search engine 150 transmits the hi-fidelity result set over the network 600 to the user's computer 500. As with the network 400, the network 600 can include a local area network ("LAN"), a wide area network ("WAN"), or the Internet, among others. In one embodiment, the hi-fidelity result set is displayed on a web browser executed on the user's computer 500. The computer 500 can be, for example, a personal computer ("PC"), UNIX or Linux workstation, thin, thick, or smart client, or other device capable of receiving a hi-fidelity result set. The web browser is a software program such as Microsoft Internet Explorer® or Mozilla Firefox®.

In the embodiment shown in FIG. 1, the server 100 is in communication with a data store 200 comprising a plurality of databases 210, 220, and 230. The Data Store 200 resides on a computer-readable medium, such as described above. In one embodiment, the Data Store 200 further comprises a database management system. The database management system performs tasks, such as controlling the organization, storage, management, and retrieval of data in the databases. Examples of database management systems include Oracle Database® offered by Oracle Corporation, DB2®, offered by International Business Machines Corporation, Microsoft SQL Server® offered by Microsoft Corporation, and Sybase Adaptive Server Enterprise® offered by Sybase Incorporated. In a further embodiment, the image database 210, index database 220, and structural database 230 reside on separate data stores.

In the embodiment shown, the image database 210 includes one or more images. Each image represents one page of a document. The image database 210 further stores information regarding each image, such as the document to which it belongs and which page in the document the image represents. In one embodiment, the image database 210 also includes a unique page identifier for each image. The page identifier allows each image to be referenced and identified. In other embodiments, the image database 210 comprises images representing a portion of a page or more than one page of a document. For example, the image database 210 may comprise images representing an entire document or some portion thereof.

In the embodiment shown in FIG. 1, the index database 220 includes words that are present on a page as well as location coordinates for one or more rectangles, each of which defines an area of the page that includes the particular word. The index database 220 further includes information sufficient to identify the image that represents the page. For example, in one embodiment, the index database 220 includes a page identifier. In a further embodiment, the index database 220 includes words present on more than one page of a document. For example, the index database 220 may include words present on an entire document or some portion thereof.

The embodiment shown in FIG. 1 also comprises a structural database 230. The structural database 230 stores information regarding the structure of a page. This structural information may include information about such page elements as columns, lists, and images. For instance, in one such embodiment, a document containing two-column print would be identified as such in the structural database 230. In one embodiment, the structural database identifies the structural elements present on a page and provides coordinates of a rectangle or other polygon enclosing each identified structural element. In a further embodiment, the structural database 230 includes information about a subset of the elements present on a page. In some embodiments, a user can customize the structural elements about which the structural database 230 stores information. In one embodiment, the structural database 230 includes a page identifier. In a further embodiment, the structural database 230 includes structural elements present on more than one page of a document. For example, the structural database 230 may include structural elements present on an entire document or some portion thereof.

In further embodiments, a single database contains structural and index data. In still further embodiments, a single database contains structural and index data, as well as images. In still further embodiments, structural data, and/or index data, and/or images are stored in multiple databases.

Illustrative Methods for Providing Hi-Fidelity Search Results

Figure 2:
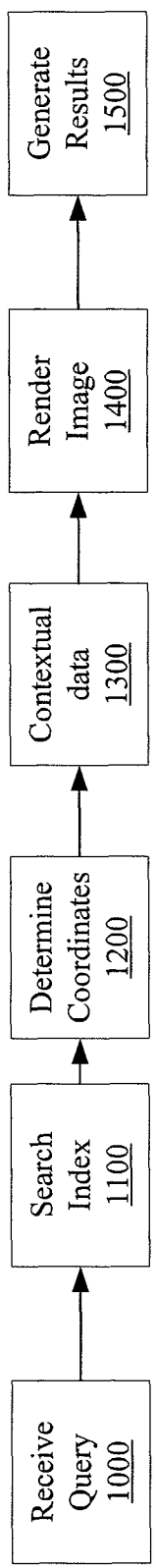
FIG. 2 is a flowchart illustrating the provision of search results in one embodiment.

FIG. 2 is a flowchart illustrating the provision of search results in one embodiment. FIG. 2 is described herein in reference to the illustrative environment shown in FIG. 1. However, the process is not limited to execution within that environment. In the embodiment shown, a search engine 150 receives a query 1000 comprising a search term. In various embodiments, the search may originate from a web page specifically designed to provide search capability or may originate from an application that includes integrated search capability.

In response, the search engine 150 searches the index for the search term 1100. For instance, in one embodiment, the search engine 150 generates a Structured Query Language ("SQL") statement for use in searching the index database 220. The search engine 150 identifies a page (or pages) satisfy the search criteria.

After identifying a page satisfying the search criteria, the search engine 150 determines what portion of a page contains content matching the criteria 1200. For instance, in one embodiment, the search engine 150 determines the coordinates of a polygon, such as a rectangle, that contains one or more of the search terms.

The embodiment shown in FIG. 2, the search engine 150 next determines the coordinates of contextual data within the polygon 1300. Various embodiments extract different amounts of contextual data. For example, one embodiment extracts one line of contextual data above the line containing the search term and one line of contextual below the line containing the search term. One embodiment uses structural information about the page to determine which contextual data and what amount of that contextual data to extract. Another embodiment allows a user or administrator to specify the amount and/or type of contextual data extracted when a search term is located.

Some embodiments include computer program code to process "edge cases"—i.e., situations that arise when a search term occurs near the edge of a page or page component, e.g., a word appearing at the bottom or top of a page. For instance, in one embodiment, if the search term is found at the beginning of a document, the contextual data includes two lines after the line containing the search term. In contrast, if the search term is found at the end of a document, the contextual data includes two lines before the line containing the search term. If the search term is found on the last line of a page, but not the last line of a document, the contextual data includes the first line on the next page. If the search term is found on the first line of a page, but not the first line of a document, the contextual data includes the last line on the previous page. If the search term is found in text that is wrapped around an image, the contextual data includes the image, or, if it is a large image, the contextual data includes a portion of the image that is in line with the text. There are many other cases in which structural information may be utilized to determine which contextual data to display. The preceding examples are by no means comprehensive; they are merely representative.

After determining the coordinates of the contextual data, the search engine 150 extracts the portion of the page bounded by the coordinates determined in step 1200 and saves the extracted portion as an image. Next, the search engine 150 highlights the search term and renders an image of the contextual data 1400. These images can be of JPEG, GIF, bitmap, or any other image format.

Once the image has been rendered, the search engine 150 generates a hi-fidelity result set that includes the rendered image 1500. In some embodiments, the steps 1100-1500 are repeated for multiple documents or portions of documents that satisfy the search criteria. Once the search engine 150 has completed generating the search results, or a page of the search results, the search engine 150 transmits those results to the user's computer 500 from which the search query originated.

Illustrative Methods for Providing an Indexing Function

Figure 3:
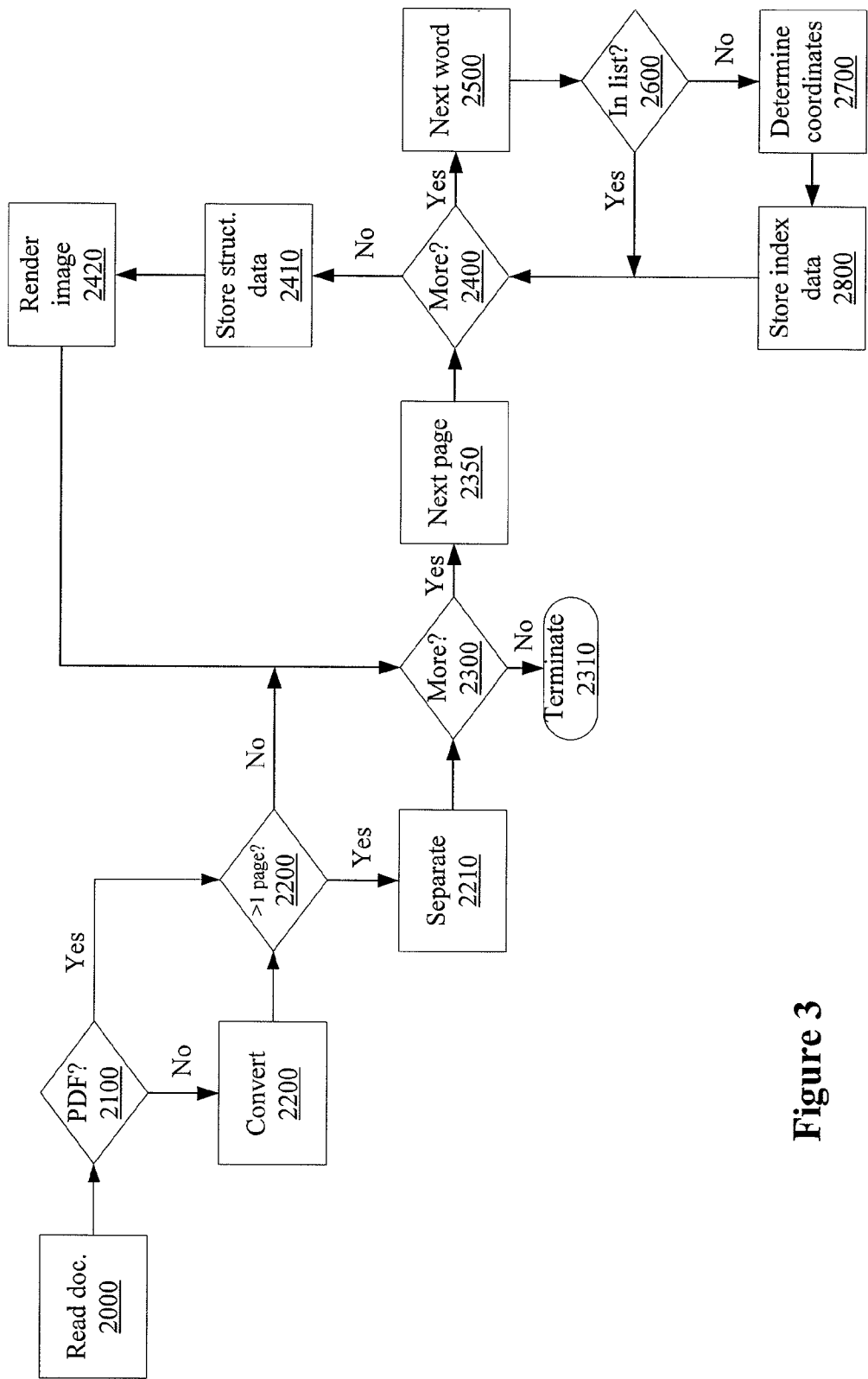
FIG. 3 is a flowchart illustrating an indexing function in one embodiment.

FIG. 3 is a flowchart illustrating an indexing function in one embodiment. In the embodiment shown, the indexing application 140 receives a document 2000, which can be of any format. Examples of formats that the embodiment can receive include Microsoft Word® document, HTML, PDF, rich text, plain text, XML, and many others that are known in the art.

In the embodiment shown, the indexing application 140 next determines whether the format of the document is PDF® 2100. For instance, the indexing application may evaluate the file extension or examine the contents of the file.

If the format is not PDF®, the indexing application 140 converts the document to PDF® 2110. For instance, the indexing application 140 may utilize a converter or distiller to perform the conversion. In the embodiment shown, the remaining steps of the process are performed on the original (native format) or the resulting PDF® document. In other embodiments, the native format is used in the subsequent steps of the process.

In the embodiment shown in FIG. 3, the indexing application 140 next determines whether the PDF® document includes multiple pages 2200. If the PDF® document includes multiple pages, then the indexing application 140 separates the document into individual pages 2210. In other embodiments, the document may be stored as a single multi-page document rather than being separated.

Once a page has been analyzed, the indexing application 140 determines whether any additional pages remain to be processed 2300. If no more pages are left to be processed, processing is terminated 2310.

However, in the embodiment shown, if a page remains to be processed 2300, the indexing application 140 selects the next page to be processed 2350. The processing of pages continues until all of the pages of the document have been processed.

The indexing application 140 may process the documents in a variety of ways. For instance, in the embodiment shown in FIG. 3, the indexing application 140 reads each word in the page, and then performs the following steps for each word. The indexing application 140 first determines if any additional words remain on the page to be read 2400. If so, the indexing application 140 reads the next word 2500. The indexing application then compares the word to an exclusion list 2600. For instance, in one embodiment, the exclusion list contains words such as "a," "an," and "the," that appear frequently on pages. These types of words are often referred to as "stop" words. Further embodiments include exclusion lists containing words in languages other than English. In another embodiment, the indexing application 140 compares the word to an inclusion list.

Some embodiments also store structural information about a page to aid in the hi-fidelity rendering of the page. For example, in the embodiment shown in FIG. 3, the indexing application 140 identifies and stores structural information about the page 2410. Structural information may include, for example, information about lists, columns, margins, images, and other structural information on the page. For instance, a document may include text in two columns. The text in one column may wrap around images within the document. This information can be used to determine how best to provide results from a specific portion of a page within the document. In a further embodiment, the information stored comprises the structural element, a page identifier, and a location on the page.

In the embodiment shown in FIG. 3, an image of the page is rendered and stored 2420. The indexing application 140 may utilize known software to render the page into an image of one of many formats, such as GIF, JPEG, TIFF, bitmap, and others. In one embodiment, the image has the native appearance of the page. Each rendered page is stored in the image database 210.

In the embodiment shown in FIG. 3, if the indexing application 140 determines that the word is not in the exclusion list and thus should be indexed, the indexing application 140 determines a coordinate location associated with the word on the page. The coordinate location comprises the coordinates of a rectangle enclosing the word on the page 2700. In existing applications, an indexing process may determine the location of a word by means of an offset, which represents the number of characters before the first letter of the word. But, such applications have shortcomings; for example, they fail to account for the structure, format, and fonts of the page. In order to overcome these shortcomings, in some embodiments the indexing application 140 determines the coordinate location of the word based on its actual position on the page, not merely in relation to other words. More specifically, some embodiments determine the coordinates of a rectangle enclosing the word. To determine the rectangle coordinates, the indexing application 140 locates the word on the page.

In one such embodiment, the indexing application 140 determines the coordinates of the top-left corner of the word and the coordinates of the bottom-right corner of the word. Thus, the points represented by the top-left and bottom-right corners of the word also constitute the top-left and bottom-right corners of the rectangle enclosing the word. In a further embodiment, the coordinates of the top-left and bottom-right corners of the rectangle are offset from the respective corners of the word. For example, the top-left corner of the rectangle may be one or more pixels above and one or more pixels to the left of the top-left corner of the word. Similarly, the bottom-right corner of the rectangle may be one or more pixels below and one or more pixels to the right of the bottom-right corner of the word. One benefit of such an embodiment is that it takes into account the fact that letters are not of a uniform height.

In another embodiment, the indexing application 140 determines the coordinates of the top-left corner of the word and the length and height of the word. As discussed above, the coordinates of the top-left corner of the word are used to determine the coordinates of the top-left corner of a rectangle enclosing the word. Next, the indexing application 140 determines the location and dimensions of the rectangle based on the length and height of the word. In one embodiment, the length and height of the sides of the rectangle are based on an offset from the length and height of the word. One benefit of such an embodiment is that it takes into account the fact that letters are not of a uniform height.

The location and dimensions of the rectangles described above can be represented by various means. In one embodiment, the indexing application 140 uses pixels to identify the coordinates. Further embodiments use units of measurement, such as millimeters and inches to identify coordinates, length, and height. For example, one embodiment identifies the top-left coordinate of a word based on its distance from the top-left corner of the page on which the word is found. Further embodiments use pixels to represent coordinates and units of measurement, such as millimeters and inches, to represent length and height.

In some cases, a word may not reside entirely on a single line. In such an instance, one embodiment identifies the coordinates of a first rectangle enclosing the first portion of the word and identifies coordinates of a second rectangle enclosing the second portion of the word, using the techniques described above for each rectangle. If a word is broken across more than two lines, one embodiment identifies coordinates of rectangles enclosing each portion of the word, using the aforementioned techniques.

In one embodiment, after identifying coordinates of one or more rectangles enclosing a word, indexing application 140 stores the index data 2800. The index data may be stored in an index entry having a word, a page identifier, and a location on the page associated with the word. In one embodiment, the location on the page associated with the word includes the coordinates of one or more rectangles enclosing the word. In the embodiment shown, after storing index data, the indexing application 140 determines whether any more words remain on the page to be processed 2400, and repeats the above-described process for each word.

Figure 4:
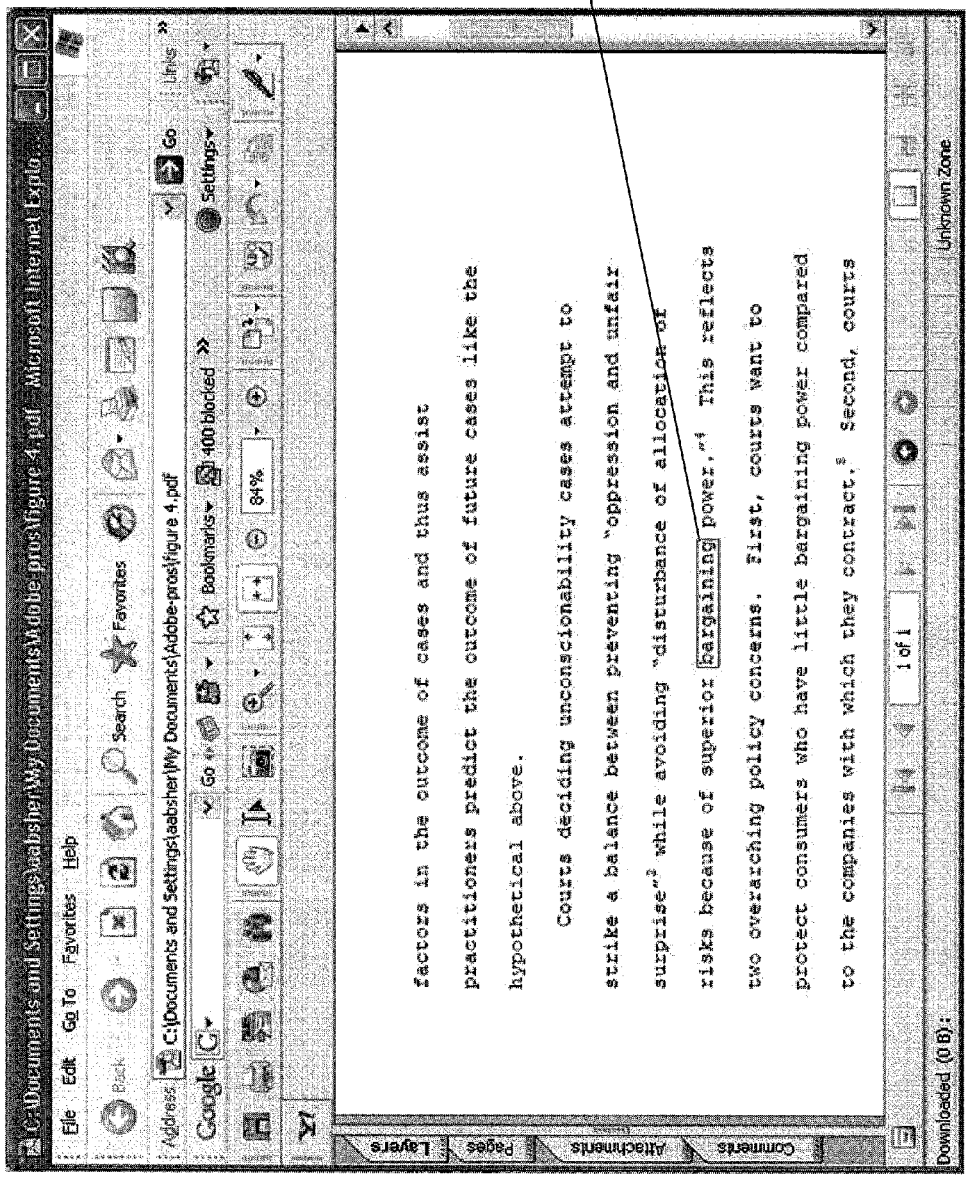
FIG. 4 is a depiction of an image of a page created according to one embodiment.

FIG. 4 is a depiction of an image of a page created according to one embodiment. In particular, FIG. 4 represents an image of a page retrieved by the crawler 130 and rendered by the indexing application 140. The word "bargaining" is enclosed with a rectangle 3000, the coordinates of which were determined according to one embodiment, using the techniques described above.

Illustrative Methods for Providing a Rendering Function

Figure 5A:
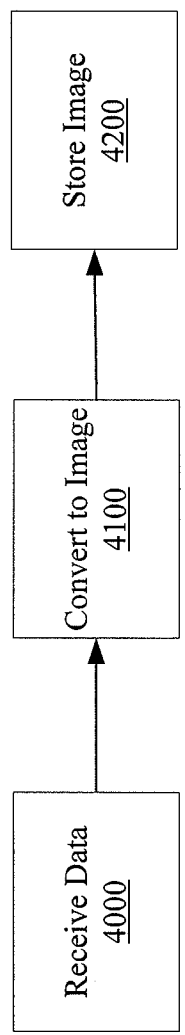
FIGS. 5a and 5b are flowcharts illustrating a rendering function in one embodiment.
Figure 5B:
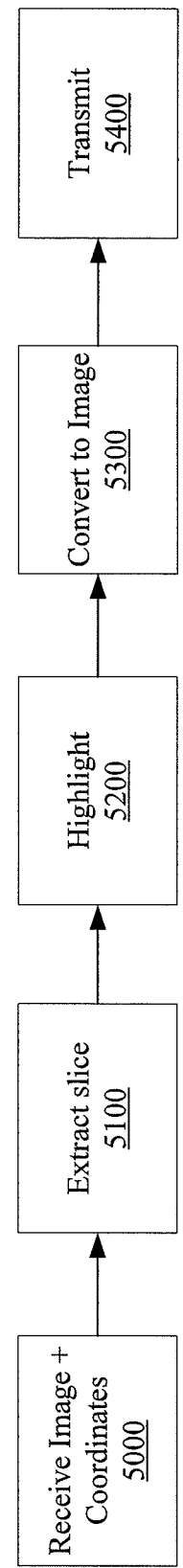

FIGS. 5a and 5b are flowcharts illustrating the rendering function in one embodiment. More particularly, FIG. 5a illustrates the rendering of a page. In the embodiment shown, the indexing application 140 performs this process for each page in a document. In one embodiment, the indexing application 140 receives a page 3000. This page may be in PDF® format. In further embodiments, the page is of various formats, such as text, Microsoft Word® format, HTML format, XML format, or any other format.

After receiving the page 4000, the indexing application 140 converts the page to an image format 4100, such as JPEG format. In another embodiment, the page is converted to a TIFF format. Further embodiments convert the page to various other formats, including GIF, bitmap, or any other image format. In one embodiment, the image has the native appearance of the page.

After converting the page to an image format, the indexing application 140 stores the image 4200 onto a computer-readable medium. In one embodiment, the image is stored on a disk drive. In further embodiments, the image is stored on tape, optical, or any other computer-readable medium. It is beneficial to store the image with identifying information in order to, for example, facilitate finding and retrieving the image. Thus, in one embodiment, the image is stored along with identifying information. In one such embodiment, the identifying information includes a document identifier and a page identifier.

There are a number of benefits to be derived from rendering a page according to embodiments. These benefits include increased speed and efficiency in finding and retrieving pages containing search terms. In particular, the ability to retrieve a single rendered page yields better performance than retrieving an image comprising an entire document containing multiple pages.

In order to provide contextual search results, it is first necessary to render a portion of a page containing contextual data. FIG. 5b illustrates the rendering of a portion of a page or pages. One embodiment performs this process in order to provide contextual search results. First, the search engine 150 receives an image of a page and coordinates 5000. In some cases, the contextual data spans more than one image. In such an instance, each image containing contextual data is sent. Further, one set of coordinates is sent corresponding to each image that is sent. Thus, if two images are sent, then two sets of coordinates are sent (i.e., one set of coordinates for each image).

After receiving the page and coordinates, the search engine 150 identifies the portion of the image corresponding to the area bound by the coordinates. Next, the application extracts that portion of the image 5100. In one embodiment, if more than one image is sent, then the search engine 150 extracts a portion of each image corresponding to each set of coordinates.

After extracting the portion of the image corresponding to the area bound by the coordinates, it is beneficial to highlight the search term. In the embodiment depicted in FIG. 5b, the search engine 150 highlights the search term 5200. In one embodiment, the highlighting step involves applying a color (e.g., yellow, pink) to the area bounded by the rectangle enclosing the search term.

After highlighting the search term, it is beneficial to render the contextual search results into an image. According to the embodiment depicted in FIG. 5b, the search engine 150 converts the portion or portions of the image or images extracted in step 5100 and highlighted in step 5200 into an image 5300. In one embodiment this image is of a JPEG format. In further embodiments, the image is of TIFF, GIF, bitmap, or any other image format.

Finally, after rendering the contextual search results into an image the image is provided as part of a hi-fidelity result set. In the embodiment depicted in FIG. 5b, the search engine 150 provides the image to a user as a hi-fidelity result set 4400.

Figure 6:
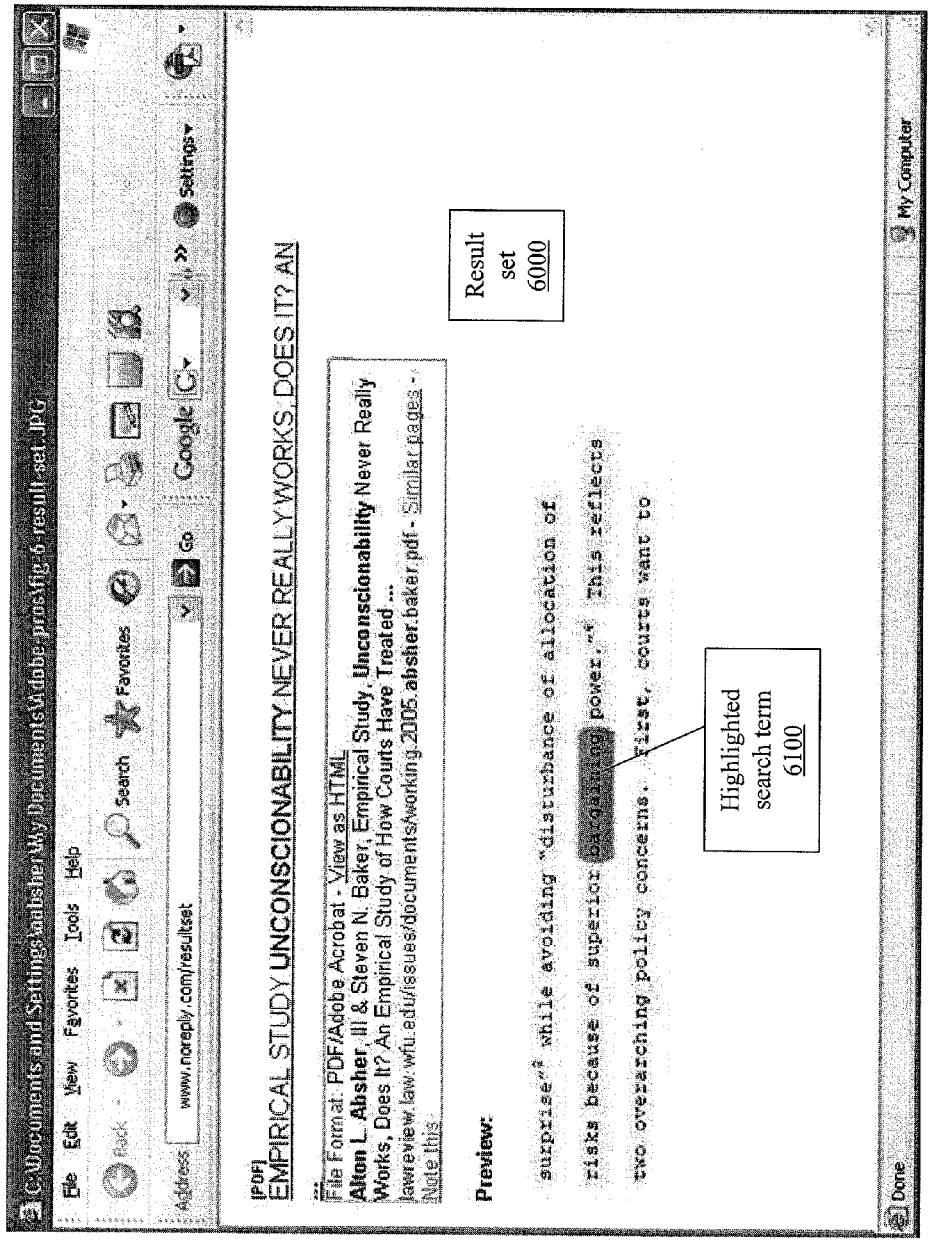
FIG. 6 is a depiction of a hi-fidelity result set provided by one embodiment.

FIG. 6 is a depiction of a hi-fidelity result set provided by one embodiment. In FIG. 6, a user searched for the term "bargaining," and the search engine 150 in one embodiment provided a hi-fidelity result set 6000 comprising contextual search results in response to the user's query. In the embodiment depicted in FIG. 6, the search term is highlighted 6100. It is apparent from FIG. 6 that the result set is hi-fidelity because it has the same native appearance as the original image of the document, depicted in FIG. 4.

Benefits of rendering a portion of a page include increased speed and efficiency in providing images containing contextual search results. In particular, the ability to provide a comparatively small image comprising the contextual search results yields better performance than providing an image representing an entire page.

Providing hi-fidelity contextual search results has numerous benefits, including showing search results to a user in context. A further benefit of embodiments of the disclosure is the ability to display the search results in hi-fidelity. Such embodiments display contextual search results with the same native appearance as in the original document. For example, in one embodiment, contextual search results appear in the same font and with the same formatting as they appear in the original page. A benefit of this feature is that when a user views multiple search results in hi-fidelity, he or she may recognize a particularly pertinent result because of its font, formatting, or the like. This may be particularly beneficial when a user is searching for a page that he or she has viewed previously.

The foregoing description of the embodiments of the disclosure has been presented only for the purpose of illustration and description and is not intended to be exhaustive or to limit the disclosure to the precise forms described. Numerous modifications and adaptations are apparent to those skilled in the art without departing from the scope of the disclosure.

I claim:

1. A computer-implemented method comprising:
   receiving, by a processor, a page having a native appearance;
   determining which words on the page are keywords awaiting indexing based on at least one of
      comparing the words on the page to an exclusion list to determine which words present in the page are excluded from an indexing operation based on being present in the exclusion list, or
      comparing the words on the page to an inclusion list to determine which words present on the page are included in the indexing operation based on being present in the inclusion list;
   generating, by the processor, an index entry for a word determined as a keyword awaiting indexing, the index entry having:
      the keyword;
      a page identifier that identifies the page on which the keyword is present; and
      a coordinate location associated with the keyword on the page, the coordinate location including coordinates that define a shape surrounding the keyword;
   storing the index entry; and
   providing a query result using the index entry, wherein providing the query result comprises:
      receiving a query comprising the keyword as a search term;
      identifying the index entry based on the keyword being the search term;
      based on the coordinate location of the identified index entry, determining an image of a portion of less than all of the native appearance of the page for display as the query result; and
      in response to the query, providing the query result for display, the query result comprising the image of the portion of less than all of the native appearance of the page.

2. The method of claim 1, wherein the index entry further comprises a unique identifier for each instance of the keyword.

3. The method of claim 1, further comprising:
   determining by at least one of the one or more processors information associated with a structural element of the page;
   generating by at least one of the one or more processors a page attribute entry comprising at least:
      the structural element;
      a page identifier; and
      a location on the page; and
   storing by at least one of the one or more processors the page attribute entry.

4. The method of claim 1, wherein the coordinate location on the page comprises a top-left coordinate and a bottom-right coordinate.

5. The method of claim 1, wherein the coordinate location on the page comprises a top-left coordinate, a height, and a width.

6. The method of claim 1, wherein the image of a portion of less than all of the native appearance of the page comprises one of a GIF, JPEG, TIFF, or bitmap format.

7. The method of claim 1, further comprising:
   determining by at least one of the one or more processors whether the keyword wraps across multiple lines; and
   when the keyword wraps across multiple lines, determining by at least one of the one or more processors the coordinate location associated with the portion of the keyword on each of the multiple lines.

8. A non-transitory computer-readable medium on which is encoded program code for indexing a page, the program code comprising:
   program code for receiving a page having a native appearance;
   program code for determining which words on the page are keywords awaiting indexing based on at least one of:
      comparing the words on the page to an exclusion list to determine which words present on the page are excluded from an indexing operation based on being present in the exclusion list, or
      comparing the words on the page to an inclusion list to determine which words present on the page are included in the indexing operation based on being present in the inclusion list;
   program code for generating an index entry for a word determined as a keyword awaiting indexing, the index entry having:
      the keyword;
      a page identifier that identifies the page on which the keyword is present; and
      a coordinate location associated with the keyword on the page, the coordinate location including coordinates that define a shape surrounding the keyword;
   program code for storing the index entry; and
   program code for providing a query result using the index entry, wherein providing the query result comprises:
      receiving a query comprising the keyword as a search term;
      identifying the index entry based on the keyword being the search term;
      based on the coordinate location of the identified index entry, determining an image of a portion of less than all of the native appearance of the page for display as the query result; and
      in response to the query, providing the query result for display, the query result comprising the image of the portion of less than all of the native appearance of the page.

9. The non-transitory computer-readable medium of claim 8, wherein the index entry further comprises a unique identifier for each instance of the keyword.

10. The non-transitory computer-readable storage medium of claim 8, further comprising:
   program code for determining information associated with a structural element of the page;
   program code for generating a page attribute entry comprising at least:
      the structural element;
      a page identifier; and
      a location on the page; and
   program code for storing the page attribute entry.

11. The non-transitory computer-readable storage medium of claim 8, wherein the coordinate location on the page comprises a top-left coordinate and a bottom-right coordinate.

12. The non-transitory computer-readable storage medium of claim 8, wherein the coordinate location on the page comprises a top-left coordinate, a height, and a width.

13. The non-transitory computer-readable storage medium of claim 8, wherein the image of a portion of less than all of the native appearance of the page comprises one of a GIF, JPEG, TIFF, or bitmap format.

14. The non-transitory computer-readable storage medium of claim 8, further comprising:
   computer code for determining whether the keyword wraps across multiple lines, and, when the keyword wraps across multiple lines, determining the coordinate location associated with the portion of the keyword on each of the multiple lines.

15. A system comprising:
   a processor; and
   a non-transitory computer readable medium comprising instructions, wherein, when executed by the processor, the instructions perform operations comprising:
      receiving a page having a native appearance;
      determining which words on the page are keywords awaiting indexing based on at least one of:
         comparing the words on the page to an exclusion list to determine which words present on the page are excluded from an indexing operation based on being present in the exclusion list, or
         comparing the words on the page to an inclusion list to determine which words present on the page are included in the indexing operation based on being present in the inclusion list;
      generating an index entry for a word determined to be a keyword awaiting indexing, the index entry having:
         the keyword;
         a page identifier that identifies the page on which the keyword is present; and
         a coordinate location associated with the keyword on the page, the coordinate location including coordinates that define a shape surrounding the keyword;
      storing the index entry; and
      providing a query result using the index entry, wherein providing the query result comprises:
         receiving a query comprising the keyword as a search term;
         identifying the index entry based on the keyword being the search term;
         based on the coordinate location of the identified index entry, determining an image of a portion of less than all of the native appearance of the page for display as the query result; and
         in response to the query, providing the query result for display, the query result comprising the image of the portion of less than all of the native appearance of the page.

16. The system of claim 15, wherein the index entry further comprises a unique identifier for each instance of the keyword.

17. The system of claim 15, wherein the operations further comprise:
   determining information associated with a structural element of the page;
   generating a page attribute entry comprising at least:
      the structural element;
      a page identifier; and
      a location on the page; and
   storing the page attribute entry.

18. The system of claim 15, wherein the coordinate location on the page comprises a top-left coordinate and a bottom-right coordinate.

19. The system of claim 15, wherein the coordinate location on the page comprises a top-left coordinate, a height, and a width.

20. The system of claim 15, wherein the operations further comprise:
   determining whether the keyword wraps across multiple lines; and
   when the keyword wraps across multiple lines, determining the coordinate location associated with the portion of the keyword on each of the multiple lines.

* * * * *